(12) United States Patent
Francescon

(10) Patent No.: US 9,423,275 B2
(45) Date of Patent: Aug. 23, 2016

(54) CAPACITIVE POSITION ENCODER

(71) Applicant: SICK STEGMANN GmbH, Donaueschingen (DE)

(72) Inventor: Massimo Francescon, Turin (IT)

(73) Assignee: SICK STEGMANN GMBH, Donaueschingen (DE)

( * ) Notice: Subject to any disclaimer, the term of this patent is extended or adjusted under 35 U.S.C. 154(b) by 98 days.

(21) Appl. No.: 14/057,209

(22) Filed: Oct. 18, 2013

(65) Prior Publication Data
US 2014/0139243 A1    May 22, 2014

(30) Foreign Application Priority Data

Nov. 19, 2012  (EP) .................................. 12193197

(51) Int. Cl.
| | |
|---|---|
| *G01R 27/26* | (2006.01) |
| *G08B 1/08* | (2006.01) |
| *G01D 5/243* | (2006.01) |
| *G01D 5/24* | (2006.01) |

(52) U.S. Cl.
CPC ............ *G01D 5/243* (2013.01); *G01D 5/2405* (2013.01)

(58) Field of Classification Search
CPC . G01R 27/2605; G01D 5/243; G01D 5/2405
USPC .................. 324/658–690; 340/538
See application file for complete search history.

(56) References Cited

U.S. PATENT DOCUMENTS

| | | | |
|---|---|---|---|
| 3,732,553 A | 5/1973 | Hardway, Jr. | |
| 3,956,743 A * | 5/1976 | Geiszler ................. | G08B 13/26 340/538 |
| 5,028,876 A * | 7/1991 | Cadwell ........................ | 324/678 |
| 7,397,226 B1 * | 7/2008 | Mannama et al. ............ | 323/273 |

FOREIGN PATENT DOCUMENTS

| | | |
|---|---|---|
| GB | 2 459 862 A | 11/2009 |
| WO | 90 08963 A1 | 8/1990 |
| WO | 2008 091730 A1 | 7/2008 |

OTHER PUBLICATIONS

European Search Report in the Counterpart Application No. 12193197.6, dated May 7, 2013, four (4) pages.

* cited by examiner

*Primary Examiner* — Farhana Hoque
(74) *Attorney, Agent, or Firm* — Nath, Goldberg & Meyer; Jerald L. Meyer

(57) ABSTRACT

The invention relates to a capacitive position encoder (1), comprising at least one capacitor with a first capacitor plate and a second capacitor plate, a dielectric modulator that is movably arranged between said first capacitor plate and said second capacitor plate, a signal source (11) for providing a phase-shifted excitation signal to the first capacitor plate of said at least one capacitor, and a charge amplifier (20) that is electrically connected to the second capacitor plate of said at least one capacitor, wherein a feedback loop (21) of the charge amplifier (20) comprises a feedback capacitor ($C_f$), wherein the capacitive position encoder (1) also comprises a shock cancellation circuit (30) that forms a parallel circuit with the feedback loop (21) including the feedback capacitor ($C_f$) and that the shock cancellation circuit (30) comprises a low pass filter (31).

7 Claims, 4 Drawing Sheets

State of the art

CAPACITIVE POSITION ENCODER

The present invention relates to capacitive position encoders, especially linear or rotary position encoders for determining a linear or angular position that are based on capacitive position sensing.

Capacitive position encoders derive the linear or angular position from a change of several capacitances as a function of the position of the object whose position is to be determined. They may, e.g. for a rotary position encoder, comprise a number of capacitors whose plates remain at a fixed position and a dielectric modulator that is moving along with the object whose position is to be measured and that is at least partly arranged between the plates of at least one of the capacitors in at least one position of the object.

The position information can be obtained from such a system by application of a series of phase shifted excitation signals to the capacitors, which leads to a modulation that is dependent on the actual position of the modulator. This modulated output signal of the sensor is typically amplified with a charge amplifier and processed further. E.g., for a rotary position encoder, it is typically transformed, converted to a digital signal by an analog-digital converter (A/D-converter), filtered and subjected to a discrete Fourier transformation (DFT) in order to obtain digital frequency signals that represent the sine and cosine of an angle or a phase to be measured. These digital frequency signals may then be filtered and processed further.

Unfortunately, however, in practice it turns out that mechanical shock can induce serious measurement errors and even lead to saturation of the system if said mechanical shock leads to a movement of the dielectric modulator in a direction towards or away from one of the capacitor plates. A movement or a component of a movement in this direction is called axial movement in this description.

To make things worse, a mechanical shock does not just lead to a single disturbation spike on the signal provided by the capacitive position encoder, but that it also induces a long damped sinusoidal tail following said disturbation spike, because the mechanical shock induces a mechanical vibration of the system, which has to fade off before the measured value is reliable again. In other words, the signal is affected for a period of time even after the mechanical shock is over.

Figure 4:
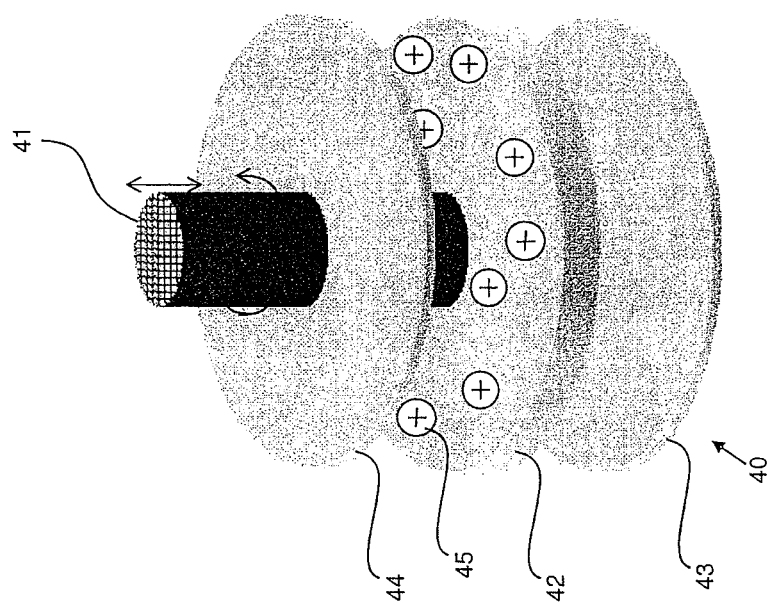

To understand the effects of this type of mechanical perturbation, it is sufficient to consider the simplified model of a known sensor for an angular encoder shown in FIG. 4. The sensor 40 comprises a shaft 41 on which a dielectric modulator is fixed to form a dielectric rotor 42 on which charges 45 are located/distributed as a function of an electric field to which the dielectric rotor 42 or parts thereof are exposed. Shaft 41 and the dielectric rotor 42 can rotate relative to a first capacitor plate 43, acting as stator transmitting plate, and a second capacitor plate 44, acting as stator receiving plate. Rotation of the shaft 41 and the dielectric rotor 42 that is fixed to it corresponds to angular movement of the system, whereas a movement of the dielectric rotor 42 in the direction of the axis of the shaft 41 corresponds to axial movement.

The sensor 40 displayed in FIG. 4 is a simplified model. In order to obtain a working sensor, stator transmitting plate and/or stator receiving plate should be segmented in such a way that each corresponding pair of segments on stator transmitting plate and stator receiving plate, respectively, form a separate capacitor. This segmentation is not shown, because it is irrelevant for the following consideration, even though it is crucial for obtaining a working sensor. For the same reason, it is not shown that the dielectric rotor 42 has to be structured in such a way that at least between two of the different capacitors formed by the respective segments of stator transmitting plate and stator receiving plate, respectively, different amounts of dielectric material are present in order to be able to detect angular movement by varying response of the respective capacitors to an electric excitation signal provided at the stator transmitting plate.

It is instructive to estimate the order of magnitude of the effect using the above-described simplified system of two metallic plates, forming a capacitor and a dielectric body with a surface $S=300$ mm$^2$ carrying an electrical charge $Q=10^{-10}$ C located in between said metallic plates at a distance D to one of the metallic plates whose voltage signal $V_s$ in turn is connected to a charge amplifier whose output voltage $V_o$ is fed back via a capacitance $C_f$, a variation of the distance D leads to a change in the Voltage signal $V_s$ given by $$\frac{dV_s}{dt} = \frac{Q}{\varepsilon_o S} \frac{dD}{dt} \quad (1)$$

bearing in mind that $$V_0 = -\frac{C_s}{C_f} V_s \quad (2)$$

and assuming typical parameter values $$\frac{dD}{dt} = \frac{0.1 \text{ m}}{s} \quad (3)$$

and $$C_s \approx C_f, \quad (4)$$

one obtains $$\frac{dV_s}{dt} = 3700 \frac{V}{s} \quad (5)$$

Accordingly, it turns out that the shock-induced effect has an order of magnitude of several Volts if the shock lasts 1 ms, which is likely to induce a significant effect on the obtained position information.

Therefore, the problem to be solved by the invention is to provide a capacitive position encoder whose output is less dependent on the effects of mechanical shock. This problem is solved by a capacitive position encoder with the features of claim 1.

The capacitive position encoder according to this invention comprises at least one capacitor with a first capacitor plate and a second capacitor plate and a dielectric modulator that is movably arranged between said first capacitor plate and said second capacitor plate. More precisely, the arrangement is such that movement of the dielectric modulator varies the amount of dielectric material present between a given pair of capacitor plates and thus leads to a response of the capacitor to an excitation signal, typically a periodic, preferredly sinusoidal excitation signal, that is applied to it that is dependent on the position of the dielectric modulator and thus indicative for a position of an object whose position is correlated to the dielectric modulator.

In order to provide said excitation signal, the capacitive position encoder comprises a signal source for providing a phase-shifted excitation signal to the first capacitor plate of said at least one capacitor.

Still further, the capacitive position sensor comprises a charge amplifier whose input is electrically connected to the second capacitor plate of said at least one capacitor, wherein the feedback loop of the charge amplifier comprises, as usual for charge amplifiers, a feedback capacitor. The output signal of said charge amplifier may then be used as an input signal for further signal processing circuitry, e.g. conversion to a digital signal by a A/D-converter, filtering and/or performing a discrete Fourier transformation (DFT) in order to obtain digital frequency signals that represent the sine and cosine of an angle or a phase to be measured in the case of a rotary/angular encoder.

An essential feature of the capacitive position sensor according to the invention is that the capacitive position encoder also comprises a shock cancellation circuit that forms a parallel circuit with the feedback loop including the feedback capacitor. The function of said shock cancellation circuit is the attenuation of the gain of the charge amplifiers for frequencies that are typical for shock-induced mechanical excitation. At the same time, this attenuation, which leads to a modification of the transfer function of the charge amplifier, should affect the transfer function in the frequency region as little as possible in order to avoid further phase drift, which would decrease the overall system accuracy.

By this arrangement, the effect of mechanical shocks on the output signal of the charge amplifier can be significantly reduced.

According to the invention, the shock cancellation circuit comprises a low pass filter. In most applications, the disturbing mechanical excitation frequency that is induced by the mechanical shock is lower than the frequency of the excitation signal used to obtain the position signal. A low pass filter with a cutoff set between the disturbing mechanically induced frequency and the frequency of the excitation signal arranged in a parallel branch of the charge amplifier's feedback loop will therefore couple the inverted signal component that is induced by the mechanically induced vibration back to the charge amplifier input and is therefore well suited to suppress this disturbing signal contribution. Specifically, it has been found that using a two pole active filter as low pass filter leads to an optimized circuit implementation and minimization of effects in the frequency range of the excitation signal.

Furthermore, it is advantageous if the shock cancellation circuit comprises a coupling capacitor for controlling the gain of the shock cancellation circuit. This coupling capacitor, which is preferredly located behind the low pass filter in the feedback loop, allows for choosing the gain of the added parallel loop branch of the charge amplifier. Specifically, by means of such a coupling capacitor a positive feedback which might make the whole system unstable can be avoided reliably at any frequency.

A very simple, yet highly efficient embodiment of the capacitive position encoder is achieved by a shock cancellation circuit that consists of the low pass filter and the coupling capacitor. However, in an alternative advantageous embodiment the shock cancellation circuit also comprises a non-linear block at the output of the low pass filter. By addition of this component it is possible to achieve reduction or even nullification of the shock cancellation circuit output signal under normal operating conditions. This will avoid unwanted side-effects of the added shock cancellation circuit, such as a contribution to a low phase drift in the capacitive position encoder's analog section during normal operation.

Standard types of non-linearity that convey this behavior on a non-linear block are a dead zone or an amplitude operated gate. However, also smoother curves may be realized.

In yet another advantageous embodiment of the invention, the capacitive position encoder comprises a measuring device for measuring the signal amplitude of an output signal of the low pass filter. In this way, the presence and entity of a mechanical shock can be detected.

Figure 1:
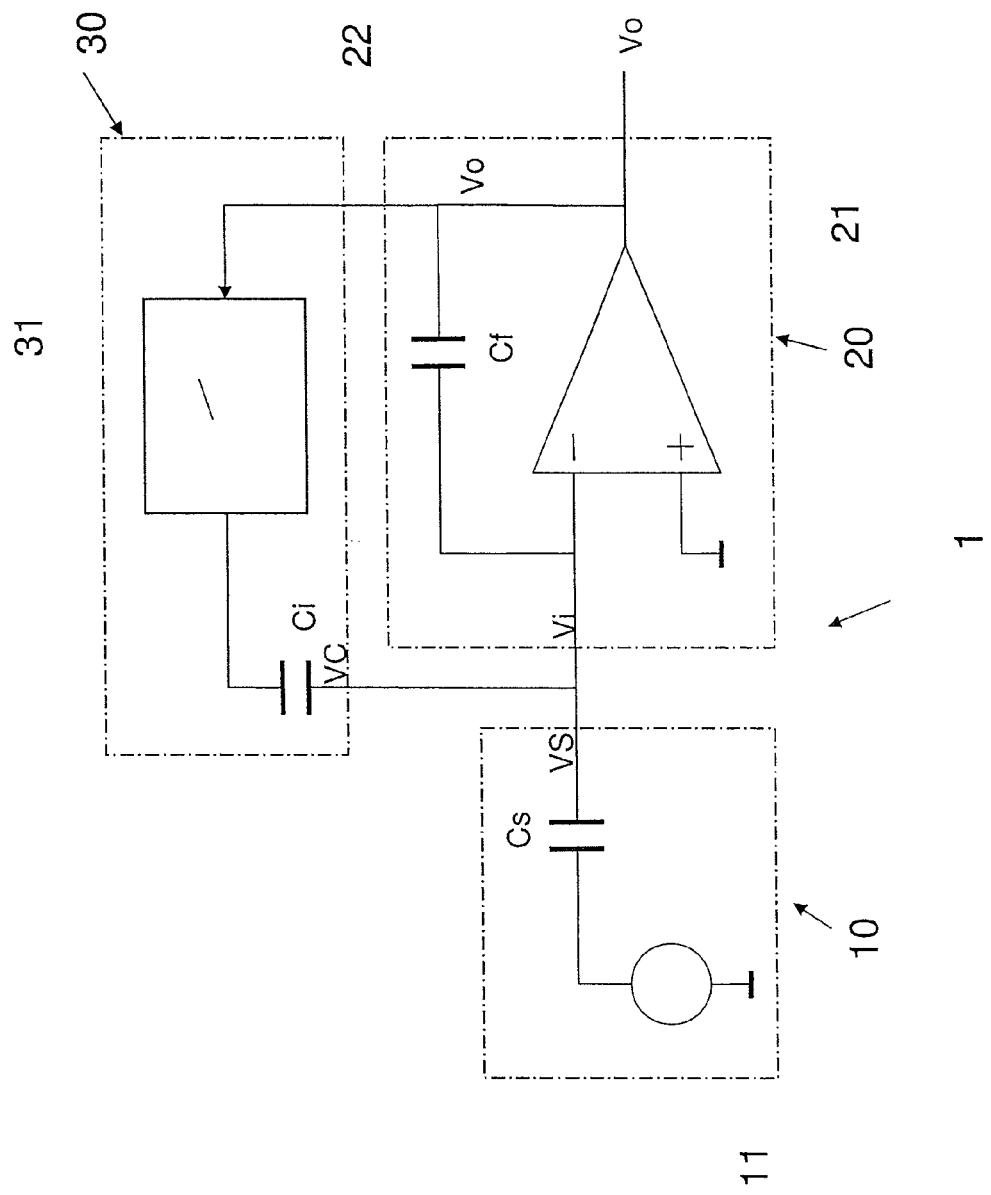
Figure 2:
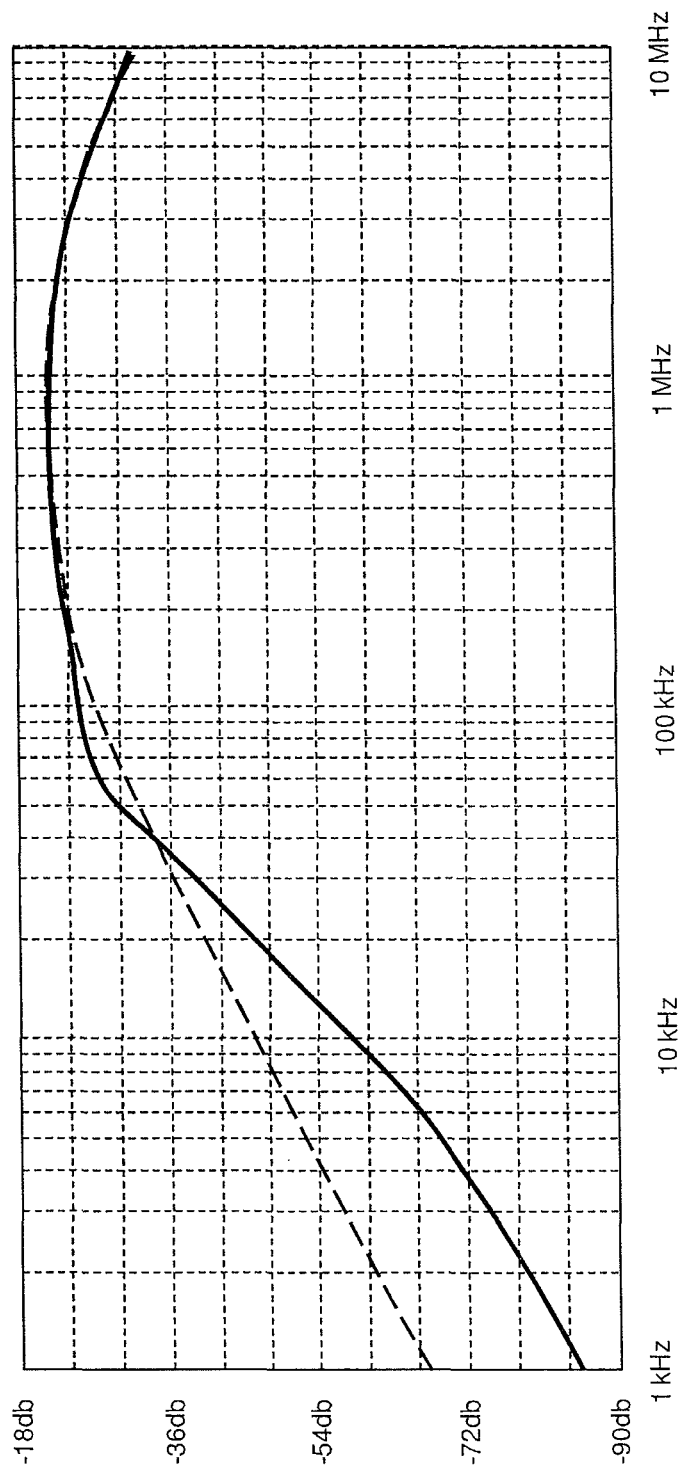
Figure 3:
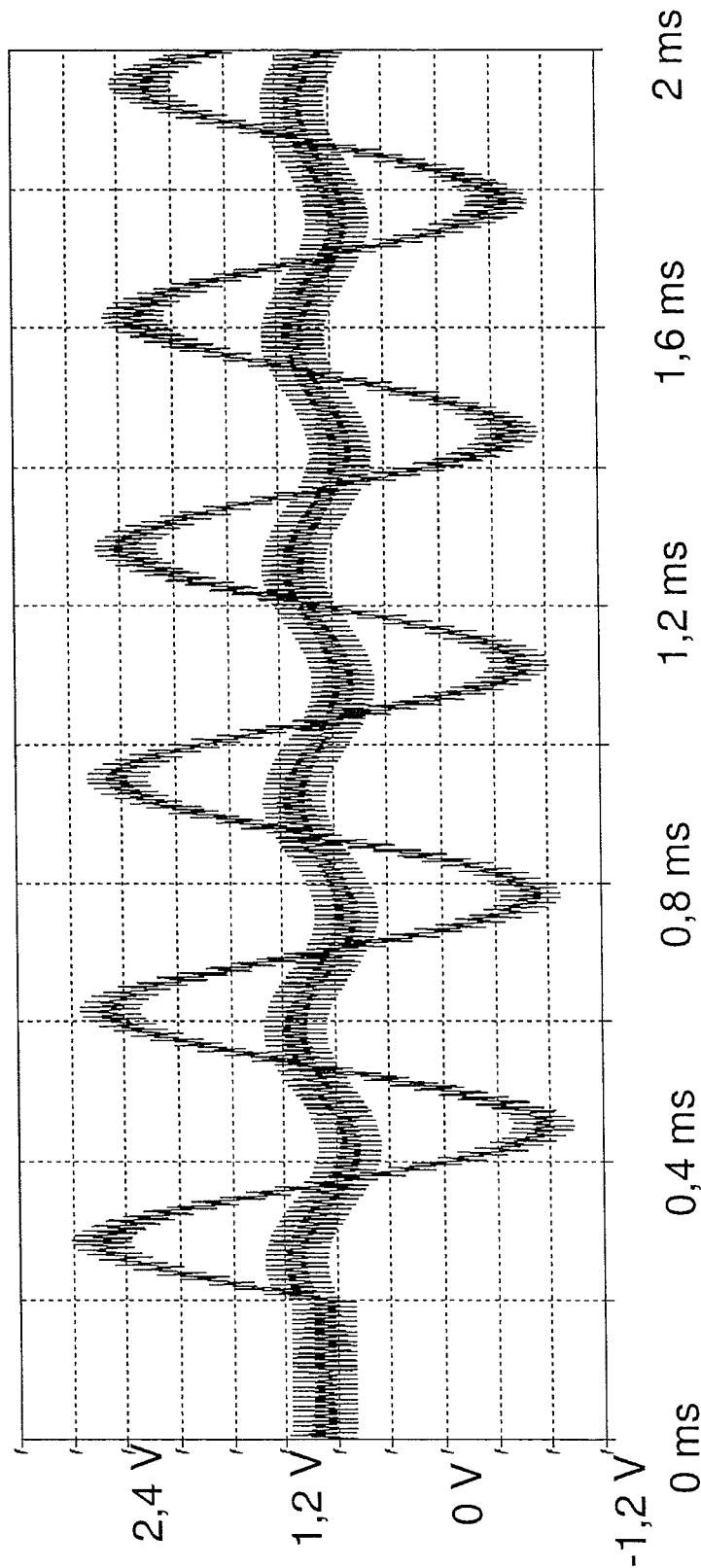

Next, the invention is explained in more detail based on figures relating to specific embodiments of the invention. The figures show:

FIG. 1: a circuit diagram of a capacitive position encoder according to an embodiment of this invention, FIG. 2: a plot comparing the transfer functions of a charge amplifier with and without a shock cancellation circuit, FIG. 3: a plot illustrating the effect of a shock cancellation circuit on the output of the charge amplifier of a capacitive position encoder that is exposed to mechanical shock, and FIG. 4: a simplified model of an angular position sensor according to the state of the art.

FIG. 1 shows a circuit diagram of a capacitive position encoder 1 or a portion thereof according to an embodiment of this invention. The circuit capacitive position encoder 1 is composed of three blocks: a sensor block 10, a charge amplifier block 20 and a shock cancellation block 30.

The sensor block 10 comprises a signal source 11, e.g. a frequency generator that is preferredly capable of providing several phase shifted sinusoidal signals, and the sensor capacitance $C_s$. Note that the sensor capacitance $C_s$ is not just a capacitor, but represents the capacitance of a capacitor with first plate and second plate. Accordingly, it also includes the effect of the dielectric modulator at its present position. Therefore, the sensor capacitance $C_s$ is a function of the position of the dielectric modulator and thus of an object that determines this position. Accordingly, the output signal $V_s$ of sensor block 10 also comprises position information.

The charge amplifier block 20 comprises an operational amplifier 21 with a feedback loop 22 and a feedback capacitor $C_f$. As typical for charge amplifiers, the positive input + of the operational amplifier 21 is grounded, whereas at the negative input − of the operational amplifier 21 the signal to be processed, i.e. the input signal $V_i$ to the charge amplifier block 20 superimposed with the output signal of the feedback loop 22 is fed in. The output signal $V_o$ of the operational amplifier 21 is fed to the feedback loop 22 and provided as output signal of the charge amplifier block 20 for further processing.

In contrast to previously known capacitive position encoders, position encoder 1 according to this invention also comprises a shock cancellation circuitry formed by shock cancellation block 30 comprising a low pass filter 31 and a coupling capacitor $C_i$. The shock cancellation block 30 forms a second, parallel branch to the feedback loop 22 of the charge amplifier block 20. Accordingly, the output signal $V_o$ of the operational amplifier 21 is the input signal for shock cancellation block 30. This input signal is filtered by low pass filter 31 and superimposed to the output signal $V_s$ of the sensor block 10 to form the input signal $V_i$ to the charge amplifier block 20. The gain for this second, parallel branch is determined by coupling capacitor $C_i$, which should be chosen in such a way that positive feedback is avoided at all frequencies.

The output $V_c$ of the shock cancellation block 30 should have a signal close to zero at normal working conditions, as the spectrum of the signal under the cutoff frequency has no energy.

However, as discussed above, mechanical shock can induce serious measurement errors and even lead to saturation of the system if said mechanical shock leads to a movement of the dielectric modulator in a direction towards or away from one of the capacitor plates. If a mechanical shock did affect the sensor output signal, a signal $V_c$ that mimics the perturbation of the signal is found as the output of the shock cancellation block 30. $V_c$ is opposed in phase (and thus sign) due to the inverting topology of the operational amplifier 21, so that most of the shock effects are cancelled.

For the sake of completeness, it should be pointed out that specifically capacitive rotary encoders comprise several sensor, charge amplifier and shock canceller blocks, respectively, and that in this situation one signal source is sufficient to provide phase shifted excitation signals for all sensor blocks.

FIGS. 2 and 3 illustrate the effects of the shock cancellation block 30 for a case in which the excitation signal of the sensor is a sinusoidal signal with a frequency of 146 kHz and the mechanical shock induces a sinusoidal vibration of the dielectric modifier with a frequency of about 3 kHz. As low pass filter in this example, a two pole active filter with a cutoff set at 21 kHz was used.

FIG. 2 shows a plot comparing the transfer functions of charge amplifier block 20 with shock cancellation circuit 30, displayed as continuous line and without shock cancellation circuit 30, displayed as dashed line. Up to a frequency of about 3 kHz, an attenuation of about 20 dB is achieved without any notable effect at high frequencies. The only drawback, which can be remedied by more complex implementations of the shock cancellation circuit 30 if necessary for a given application, is a slight amplification just above the filter cutoff.

FIG. 3 illustrates the effect of a shock cancellation circuit on the output of the charge amplifier 20 of a capacitive position encoder 1 that is exposed to mechanical shock. At 0.2 ms, the mechanical shock is applied. As can be seen immediately by comparing the output with shock cancellation, which corresponds to the line with smaller amplitude of about 0.4V peak-to-peak, and the output without shock cancellation, which corresponds to the line with large amplitude of about 3.3V peak-to-peak, output signal variations are significantly reduced by the shock cancellation. This leads to a reduction of the voltage dynamic range that is required to avoid saturation by a factor of 4. A further positive side effect is a reduction of any other kind of noise from external or intrinsic sources lying in the attenuation band.

REFERENCE NUMERALS 1 capacitive position encoder
10 sensor block
11 signal source
20 charge amplifier block
21 operational amplifier
22 feedback loop
30 shock cancellation block
31 low pass filter
40 sensor
41 shaft
42 dielectric rotor
43 first capacitor plate
44 second capacitor plate
45 electric charge
$C_s$ sensor capacitance
$V_s$ output signal of sensor block
$C_f$ feedback capacitor
$V_i$ input signal to operational amplifier
$V_o$ output signal from operational amplifier
$C_i$ coupling capacitor
$V_c$ output signal from shock cancellation block

The invention claimed is:

1. Capacitive position encoder (1), comprising
at least one capacitor with a first capacitor plate and a second capacitor plate,
a dielectric modulator that is movably arranged between said first capacitor plate and said second capacitor plate,
a signal source (11) for providing a phase-shifted excitation signal to the first capacitor plate of said at least one capacitor, and
a charge amplifier (20) that is electrically connected to the second capacitor plate of said at least one capacitor, wherein a feedback loop (21) of the charge amplifier (20) comprises a feedback capacitor ($C_f$),
characterized in that the capacitive position encoder (1) also comprises a shock cancellation circuit (30) that forms a parallel circuit with the feedback loop (21), the feedback loop including the feedback capacitor ($C_f$), wherein the shock cancellation circuit (30) consists of a low pass filter (31) and a coupling capacitor ($C_i$) for controlling a gain of the shock cancellation circuit (30).

2. Capacitive position encoder (1) according to claim 1, characterized in that the shock cancellation circuit (30) comprises a non-linear block at the output of the low pass filter (31).

3. Capacitive position encoder (1) according to claim 2, characterized in that a non-linearity of the non-linear block is a dead zone or an amplitude operated gate.

4. Capacitive position encoder (1) according to claim 3, characterized in that the capacitive position encoder (1) comprises a measuring device for measuring a signal amplitude of an output signal of the low pass filter.

5. Capacitive position encoder (1) according to claim 2, characterized in that the capacitive position encoder (1) comprises a measuring device for measuring a signal amplitude of an output signal of the low pass filter.

6. Capacitive position encoder (1) according to claim 1, characterized in that the capacitive position encoder (1) comprises a measuring device for measuring a signal amplitude of an output signal of the low pass filter.

7. Capacitive position encoder (1) according to claim 1, characterized in that the capacitive position encoder (1) comprises a measuring device for measuring a signal amplitude of an output signal of the low pass filter.

* * * * *